US008224254B2

(12) United States Patent
Haykin (10) Patent No.: US 8,224,254 B2
(45) Date of Patent: Jul. 17, 2012

(54) OPERATING ENVIRONMENT ANALYSIS TECHNIQUES FOR WIRELESS COMMUNICATION SYSTEMS

(75) Inventor: Simon Haykin, Ancaster (CA)

(73) Assignee: McMaster University, Ontario (CA)

( * ) Notice: Subject to any disclaimer, the term of this patent is extended or adjusted under 35 U.S.C. 154(b) by 885 days.

(21) Appl. No.: 11/577,258

(22) PCT Filed: Oct. 13, 2005

(86) PCT No.: PCT/CA2005/001562
§ 371 (c)(1),
(2), (4) Date: Oct. 29, 2008

(87) PCT Pub. No.: WO2006/039800
PCT Pub. Date: Apr. 20, 2006

(65) Prior Publication Data
US 2009/0052570 A1    Feb. 26, 2009

Related U.S. Application Data

(60) Provisional application No. 60/617,639, filed on Oct. 13, 2004, provisional application No. 60/617,638, filed on Oct. 13, 2004.

(51) Int. Cl.
*H04B 17/00* (2006.01)
(52) U.S. Cl. ............ 455/67.11; 455/66.1; 455/62
(58) Field of Classification Search ........... 455/67.11, 455/66.1, 62
See application file for complete search history.

(56) References Cited

U.S. PATENT DOCUMENTS

| | | | |
|---|---|---|---|
| 5,768,268 A | 6/1998 | Kline et al. | |
| 6,052,605 A | 4/2000 | Meredith et al. | |
| 6,084,919 A | 7/2000 | Kleider et al. | |
| 6,130,907 A | 10/2000 | Chen | |
| 6,714,605 B2 | 3/2004 | Sugar et al. | |
| 7,020,482 B2 | 3/2006 | Medvedev | |
| 7,076,246 B2 | 7/2006 | Chitrapu | |
| 7,184,992 B1 | 2/2007 | Polyak et al. | |
| 7,308,232 B2 * | 12/2007 | Thomson | 455/67.11 |
| 2002/0058482 A1 | 5/2002 | Agin et al. | |
| 2002/0061031 A1 | 5/2002 | Sugar et al. | |
| 2003/0086514 A1 | 5/2003 | Ginis et al. | |
| 2003/0128658 A1 | 7/2003 | Walton et al. | |
| 2003/0157932 A1 | 8/2003 | Chitrapu | |
| 2003/0181213 A1 | 9/2003 | Sugar et al. | |

(Continued)

FOREIGN PATENT DOCUMENTS

WO    WO 03049319    6/2003

(Continued)

OTHER PUBLICATIONS

W003063384, Apr. 20, 2006.

(Continued)

*Primary Examiner* — Yuwen Pan
(74) *Attorney, Agent, or Firm* — Clark Hill, PLC (57) ABSTRACT

Methods and systems of analyzing an operating environment of wireless communication equipment in a wireless communication system are provided. A stimulus in the operating environment at a location of the wireless communication equipment is sensed and linearly expanded in Slepian sequences using a multitaper spectral estimation procedure. A singular value decomposition is performed on the linearly expanded stimulus, and a singular value of the linearly expanded stimulus provides an estimate of interference at the location of the wireless communication equipment.

29 Claims, 3 Drawing Sheets

U.S. PATENT DOCUMENTS

| | | | |
|---|---|---|---|
| 2003/0198200 | A1 | 10/2003 | Diener et al. |
| 2004/0009781 | A1 | 1/2004 | Andrews et al. |
| 2004/0028003 | A1 | 2/2004 | Diener |
| 2004/0028123 | A1 | 2/2004 | Sugar et al. |
| 2004/0047324 | A1 | 3/2004 | Diener |
| 2004/0092281 | A1 | 5/2004 | Burchfiel |
| 2004/0152423 | A1 | 8/2004 | Reznik |
| 2004/0198304 | A1 | 10/2004 | Wang |
| 2005/0018611 | A1 | 1/2005 | Chan et al. |
| 2009/1019763 | | 8/2009 | Ghosh et al. |
| 2009/1023203 | | 9/2009 | Marx |

FOREIGN PATENT DOCUMENTS

| | | |
|---|---|---|
| WO | WO 03049466 | 6/2003 |

OTHER PUBLICATIONS

W003090037, Apr. 20, 2006.
W003092231, Apr. 20, 2006.
Search Report dated Feb. 13, 2006 in respect of International PCT Application No. PCT/CA2005/001562.
Search Report dated Nov. 22, 2005 in respect of International PCT Application No. PCT/CA2005/001565.
Supplementary Search Report dated Nov. 28, 2008 issued in respect of European Application No. 05794586.7.
Supplementary Search Report dated Nov. 28, 2008 issued in respect of European Application No. 05797181.4.
"Extrapolation algorithms for discrete signals with application in spectral estimation", Jain A.; Ranganath, S., Acoustics, Speech and Signal Processing [see also IEEE Transactions on Signal Processing] vol. 29, Issue 4, Aug. 1981, pp. 830-845 (entire document).
"Singular value decomposition, singular vectors, and the discrete prolate spheroidal sequences", Zhou, Y.; Rushforth, C.; Frost, R.; Acoustics, Speech, and Signal Processing, IEEE International Conference on ICASSP '84. vol. 9, Part 1, Mar. 1984, pp. 92-95 (entire document).
Haykin: "Cognitive Radio: Brain Empowered Wireless Communications", IEEE Journal on Selected Areas in Communications, vol. 23, No. 2; Feb. 2005, pp. 201-220 (whole document).
Yu, et al.: "Distributed Multiuser Power Control for Digital Subscriber Lines"; IEEE Journal on Selected Areas in Communications, vol. 20, No. 5; Jun. 2002, pp. 1105-1115 (whole document).
Ye et al.: "Optimized Signalling for MIMO Interference Systems with Feedback"; IEEE Transactions on Signal Processing, vol. 51, No. 11; Nov. 2003, pp. 2839-2848 (whole document).
Scutari G. et al.: "On the Maximum Achievable Rates in Wireless Meshed Networks: Centralized versus Decentralized Solutions", IEEE International Conference on Acoustics, Speech and Signal Processing, vol. 4; May 17-21, 2004; pp. iv-573-iv 576 vol. 4 (whole document).
Weiss, Jondral: "Spectrum pooling: an innovative strategy for the enhancement of spectrum efficiency", IEEE Communications Magazine, vol. 42, No. 3, Mar. 2004, pp. S8-S14, XP011108909 Piscataway, US.
Thomson: "Spectrum estimation and harmonic analysis" Proceedings of the IEEE, vol. 70, No. 9, Sep. 1982 pp. 1055-1096, XP000909959 New York, US.
"SDR Technology Implementation for the Cognitive Radio", Bruce Fette, General Dynamics, 2003, pp. 1-32.
"Comments of the Wireless Communications Association International, Inc.", Paul J. Sinderbrand; Before the Federal Communications Commission, Washington, D.C., Apr. 5, 2004, 33 pages.
"Cognitive Radio Technologies in the Commercial Area", Bill Lane, FCC Cognitive Radio Workshop, Apr. 19, 2003, pp. 1-13.
"Beyond the Outer Limits—XG Next Generation Communications", Preston Marshall, FCC Cognitive Radio Conference, Apr. 19, 2003, pp. 1-12.
"Cognitive Radio, An Integrated Agent Architecture for Software Defined Radio", Joseph Mitola III, Royal Institute of Technology, May 8, 2000, 313 pages.
"Frequency Agile Spectrum Access Technologies", Mark McHenry, FCC Workshop on Cognitive Radios, May 19, 2003, pp. 1-25.
SmartRRM for WLANS, InterDigital, Brochure, © 2004, 2 pages.
Jeff Foerster, Evan Green, Srinivasa Somayazulu, David Leeper, "Ultra-Wideband Technology for Short- or Medium-Range Wireless Communications", Intel Technology Journal, Q2, 2001, pp. 1-11.
Spectrum Policy and Technology, Spectrum Access and the Promise of Cognitive Radio Technology; May 19, 2003, 11 pages.
http://webarchive.org/web/20040714082438/http://www.mrc-cbu.cam.ac.uk (downloaded Aug. 31, 2010).

* cited by examiner

OPERATING ENVIRONMENT ANALYSIS TECHNIQUES FOR WIRELESS COMMUNICATION SYSTEMS

CROSS-REFERENCE TO RELATED APPLICATIONS

This application claims the benefit of U.S. Provisional Patent Application Ser. Nos. 60/617,638 and 60/617,639, both filed on Oct. 13, 2004.

This application also claims the benefit of, and is a National Phase Entry of, PCT Application Serial No. PCT/CA2005/001562, which in turn claims the benefit of the above provisional patent applications.

The entire contents of these related patent applications are incorporated in their entirety herein by reference.

FIELD OF THE INVENTION

This invention relates generally to wireless communications and, in particular, to analysis of operating environments in wireless communication systems.

BACKGROUND

In the field of wireless communications, cognitive radio is viewed as a novel approach for improving the utilization of a precious natural resource, the radio electromagnetic spectrum.

The cognitive radio, built on a software-defined radio, is defined as an intelligent wireless communication system that is aware of its environment and uses the methodology of understanding-by-building to learn from the environment and adapt to statistical variations in the input stimuli, with two primary objectives in mind, namely highly reliable communication whenever and wherever needed, and efficient utilization of the radio spectrum.

Attaining these objectives in cognitive radio therefore involves analysis of the operating environment of communication equipment. However, conventional techniques for operating environment analysis in wireless communication systems are not sufficiently accurate for use in cognitive radio.

SUMMARY OF THE INVENTION

Therefore, there remains a need for accurate operating environment analysis techniques for wireless communication systems. Analysis techniques having sufficient accuracy for application to cognitive radio may be particularly preferred.

According to one aspect of the invention, there is provided a method of analyzing an operating environment of wireless communication equipment in a wireless communication system. The method involves sensing a stimulus in the operating environment at a location of the wireless communication equipment, linearly expanding the stimulus in Slepian sequences using a multitaper spectral estimation procedure, and performing a singular value decomposition on the linearly expanded stimulus, a singular value of the linearly expanded stimulus providing an estimate of interference at the location of the wireless communication equipment.

In some embodiments, sensing involves sensing a plurality of stimuli.

In some embodiments, sensing involves sensing a stimulus at each of M sensors, and wherein linearly expanding comprises determining elements of a spatio-temporal complex-valued matrix $$A(f) = \begin{bmatrix} w_1 Y_1^{(1)}(f) & w_1 Y_2^{(1)}(f) & \cdots & w_1 Y_K^{(1)}(f) \\ w_2 Y_1^{(2)}(f) & w_2 Y_2^{(2)}(f) & \cdots & w_2 Y_K^{(2)}(f) \\ \vdots & & & \vdots \\ w_M Y_1^{(M)}(f) & w_M Y_2^{(M)}(f) & \cdots & w_M Y_K^{(M)}(f) \end{bmatrix}$$

where
elements of each column of the matrix are produced using stimuli sensed by respective sensors;
elements of each row of the matrix are computed using a different one of K Slepian sequences;
$\{w_m\}_{m=1}^M$ represent variable weights accounting for respective relative areas covered by the M sensors; and
$Y_k^{(m)}(f)$ denote kth eigenspectra computed by an mth sensor.

In some embodiments, performing involves performing a singular value decomposition on the matrix A(f) to thereby yield the decomposition $$A(f) = \sum_{k=0}^{K-1} \sigma_k(f) u_k(f) v_k^\dagger(f)$$

where
$\sigma_k(f)$ is a kth singular value of matrix A(f);
$u_k(f)$ is an associated left singular vector;
$v_k(f)$ is an associated right singular vector; and
the superscript † denotes Hermitian transposition.

In some embodiments, $|\sigma_0(f)|^2$, provides the estimate of interference.

In some embodiments, a linear combination of multiple largest $|\sigma_k(f)|^2$ provides the estimate of interference.

In some embodiments, the method also includes an operation of computing a time-frequency distribution of interference estimates for the location of the wireless communication equipment by repeating the steps of sensing, linearly expanding, and performing for a plurality of bursts of operation.

In some embodiments, the method also includes determining $$D(t) = \sum_{l=0}^{L-1} \sum_{v=0}^{R-1} |\sigma_l(f_{low} + v \cdot \Delta f; t)|^2 \Delta f,$$

where
L denotes the number of largest $|\sigma_k(f)|^2$ used in the estimate of interference;
$|\sigma_l(f,t)|^2$ denotes the lth largest eigenvalue produced by a burst of stimuli received at time t;
R denotes a number of frequency resolutions of width $\Delta f$ which occupy a portion of a frequency spectrum currently being analyzed; and
$f_{low}$ denotes a lowest end of the portion of frequency spectrum currently being analyzed;
determining whether a reduction in D(t) from one burst to a next burst exceeds a threshold, and detecting a spectrum hole in which resources are available for transmission of communication signals by a transmitter where a reduction in D(t) from one burst to a next burst exceeds the threshold.

In some embodiments, determining involves determining whether fluctuations in D(t) subsequent to the reduction are less than a further threshold for a subsequent burst, and wherein detecting comprises detecting a spectrum hole where a reduction in D(t) from one burst to a next burst exceeds the threshold and fluctuations in D(t) subsequent to the reduction are less than the further threshold.

In some embodiments, the method also includes an operation of detecting, based on the estimate of interference, a spectrum hole in which resources are available for transmission of communication signals by a transmitter.

In some embodiments, the method includes an operation of selecting the detected spectrum hole for transfer of communication signals.

In some embodiments, selecting involves adapting a beamforming algorithm for use in transferring communication signals.

In some embodiments, the method involves repeating the sensing, linearly expanding, and performing and includes operations of detecting a further spectrum hole, and selecting the further spectrum hole for transfer of communication signals.

In some embodiments, the method also includes an operation of transferring communication signals using both the selected spectrum hole and the further spectrum hole.

In some embodiments, the method also includes predicting subsequent availability of the selected spectrum hole, and selecting the further spectrum hole for transfer of communication signals where the selected spectrum hole is predicted to become unavailable.

In some embodiments, predicting is based on historical communication traffic patterns for the selected spectrum hole.

In some embodiments, sensing involves sensing using a reference antenna.

In some embodiments, sensing involves sensing a plurality of stimuli using a plurality of antennas.

In some embodiments, the method includes an operation of transmitting the estimate of interference to a transmitter of communication signals.

In some embodiments, a machine-readable medium stores instructions which when executed perform the method.

Another aspect of the invention provides a system for analyzing an operating environment of wireless communication equipment in a wireless communication system. The system includes an input for receiving a stimulus in the operating environment at a location of the wireless communication equipment, and a processor operatively coupled to the input. The processor is configured to linearly expand the stimulus in Slepian sequences using a multitaper spectral estimation procedure, and to perform a singular value decomposition on the linearly expanded stimulus. A singular value of the linearly expanded stimulus providing an estimate of interference at the location of the wireless communication equipment.

In some embodiments, the processor is further configured to implement a cognitive radio.

In some embodiments, the system also includes a plurality of antennas and a transceiver operatively coupled to the plurality of antennas and to the input.

In some embodiments, the processor is further configured to output to the transceiver the estimate of interference, and the transceiver is configured to transmit the estimate of interference to other communication equipment.

In some embodiments, the system includes M sensors, each sensor being for sensing a stimulus, and the processor is configured to linearly expand the stimuli sensed by the sensors by determining elements of a spatio-temporal complex-valued matrix $$A(f) = \begin{bmatrix} w_1 Y_1^{(1)}(f) & w_1 Y_2^{(1)}(f) & \ldots & w_1 Y_K^{(1)}(f) \\ w_2 Y_1^{(2)}(f) & w_2 Y_2^{(2)}(f) & \ldots & w_2 Y_K^{(2)}(f) \\ \vdots & & & \vdots \\ w_M Y_1^{(M)}(f) & w_M Y_2^{(M)}(f) & \ldots & w_M Y_K^{(M)}(f) \end{bmatrix}.$$

In some embodiments, the processor is configured to perform a singular value decomposition by performing a singular value decomposition on the matrix A(f) to thereby yield the decomposition $$A(f) = \sum_{k=0}^{K-1} \sigma_k(f) u_k(f) v_k^\dagger(f).$$

In some embodiments, the input receives a stimulus at the location of the wireless communication equipment for a plurality of bursts of operation.

In some embodiments, the processor is further configured to determine $$D(t) = \sum_{l=0}^{L-1} \sum_{v=0}^{R-1} |\sigma_l(f_{low} + v \cdot \Delta f; t)|^2 \Delta f,$$

and to detect a spectrum hole in which resources are available for transmission of communication signals by a transmitter where a reduction in D(t) from one burst to a next burst exceeds a threshold.

In some embodiments, the processor is further configured to determine whether fluctuations in D(t) subsequent to the reduction are less than a further threshold for a subsequent burst, and to detect a spectrum hole where a reduction in D(t) from one burst to a next burst exceeds the threshold and fluctuations in D(t) subsequent to the reduction are less than the further threshold.

In some embodiments, the processor is further configured to detect, based on the estimate of interference, a spectrum hole in which resources are available for transmission of communication signals by a transmitter.

In some embodiments, the processor is further configured to select the detected spectrum hole for transfer of communication signals.

In some embodiments, the processor is further configured to adapt a beamforming algorithm for use in transferring communication signals.

In some embodiments, the processor is further configured to monitor the operating environment to detect a further spectrum hole, and to select the further spectrum hole for transfer of communication signals.

In some embodiments, the processor is further configured to cause communication signals to be transferred using both the selected spectrum hole and the further spectrum hole.

In some embodiments, the processor is further configured to predict subsequent availability of the selected spectrum hole, and to select the further spectrum hole for transfer of communication signals where the selected spectrum hole is predicted to become unavailable.

In some embodiments, the processor is configured to predict availability of the selected spectrum hole based on historical communication traffic patterns for the selected spectrum hole.

In some embodiments, the system also includes a reference antenna for sensing a stimulus, the reference antenna being operatively coupled to the input.

In some embodiments, the communication system is a Multiple-Input Multiple-Output (MIMO) communication system.

In some embodiments, the communication equipment is at least one of a mobile communication device and a base station in the communication system.

In some embodiments, the communication signals are Orthogonal Frequency Division Multiplexing (OFDM) signals.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

The electromagnetic radio spectrum is a natural resource, the use of which by transmitters and receivers is licensed by governments. In November 2002, the Federal Communications Commission (FCC) published a Report (ET Docket No. 02-135) prepared by the Spectrum-Policy Task Force aimed at improving the way in which this precious resource is managed in the United States of America. Among the Task Force Major Findings and Recommendations, the second Finding on page 3 of the Report is rather revealing in the context of spectrum utilization:

In many bands, spectrum access is a more significant problem than physical scarcity of spectrum, in large part due to legacy command-and-control regulation that limits the ability of potential spectrum users to obtain such access.

Indeed, a scan of portions of the radio spectrum would likely find that some frequency bands in the spectrum are largely unoccupied most of the time, other frequency bands are only partially occupied, and the remaining frequency bands are heavily used.

The under-utilization of the electromagnetic spectrum leads us to think in terms of "spectrum holes". A spectrum hole may be generally considered as a band of frequencies assigned to a primary user, which at a particular time and specific geographic location is not being utilized by its primary user.

Spectrum utilization can be improved significantly by making it possible for a secondary user who is not being serviced to access a spectrum hole which is not being utilized by the primary user at a current time and location of the secondary user. Cognitive radio, inclusive of software-defined radio, may offer a means to promote the efficient use of the spectrum by exploiting the existence of spectrum holes.

At this point, it may be useful to consider what is meant by "cognitive radio". The Encyclopedia of Computer Science (A. Ralston and E. D. Reilly, Encyclopedia of Computer Science, pp. 186-186, Van Nostrand Reinhold, 1993), provides a three-point computational view of cognition:

(i) mental states and processes intervene between input stimuli and output responses;

(ii) the mental states and processes are described by algorithms; and (iii) the mental states and processes lend themselves to scientific investigations.

Moreover, it may be inferred that the interdisciplinary study of cognition is concerned with exploring general principles of intelligence through a synthetic methodology which is generally termed learning by understanding. Putting these ideas together and bearing in mind that cognitive radio is aimed at improved utilization of the radio spectrum, the following definition for cognitive radio may be appropriate:

Cognitive radio is an intelligent wireless communication system that is aware of its surrounding environment (i.e., outside world), and uses the methodology of understanding-by-building to learn from the environment and adapt its internal states to statistical variations in incoming RF stimuli by making corresponding changes in certain operating parameters (e.g., transmit-power, carrier-frequency, and modulation strategy) in real-time, with two primary objectives in mind:

highly reliable communications whenever and wherever needed, and efficient utilization of the radio spectrum.

Six key words stand out in the above definition: awareness, intelligence, learning, adaptivity, reliability, and efficiency. The awareness capability of cognitive radio, for example, may embody awareness with respect to transmitted waveforms, radio frequency (RF) spectrum, communication network, geography, locally available services, user needs, language, situation, and security policy.

Implementation of this far-reaching combination of capabilities is indeed feasible today, thanks to the advances in digital signal processing, networking, machine learning, computer software, and computer hardware.

In addition to these cognitive capabilities, a cognitive radio is also endowed with reconfigurability. This latter capability is provided by a platform known as software-defined radio, upon which a cognitive radio is built. Software-defined radio (SDR) is a practical reality today, thanks to the convergence of digital radio and computer software technologies. Reconfigurability may provide the basis for such features as adaptation of a radio interface so as to accommodate variations in the development of new interface standards, incorporation of new applications and services as they emerge, incorporation of updates in software technology, and exploitation of flexible services provided by radio networks, for example.

For reconfigurability, a cognitive radio looks naturally to software-defined radio. For other tasks of a cognitive kind, the cognitive radio looks to signal-processing and machine-learning procedures for their implementation. The cognitive process, in accordance with embodiments of the invention, starts with the passive sensing of RF stimuli and culminates with action.

Cognitive radio may thus involve the following three on-line cognitive tasks. The following list includes some of the primary cognitive tasks associated with cognitive radio, but is no way intended to be exhaustive:

(i) operating environment or radio-scene analysis, which encompasses estimation of interference, illustratively as an interference temperature, of the radio environment and detection of spectrum holes;

(ii) channel identification, which encompasses estimation of channel-state information (CSI), and prediction of channel capacity for use by a transmitter; and (iii) transmit-power control and dynamic spectrum management.

Figure 1:
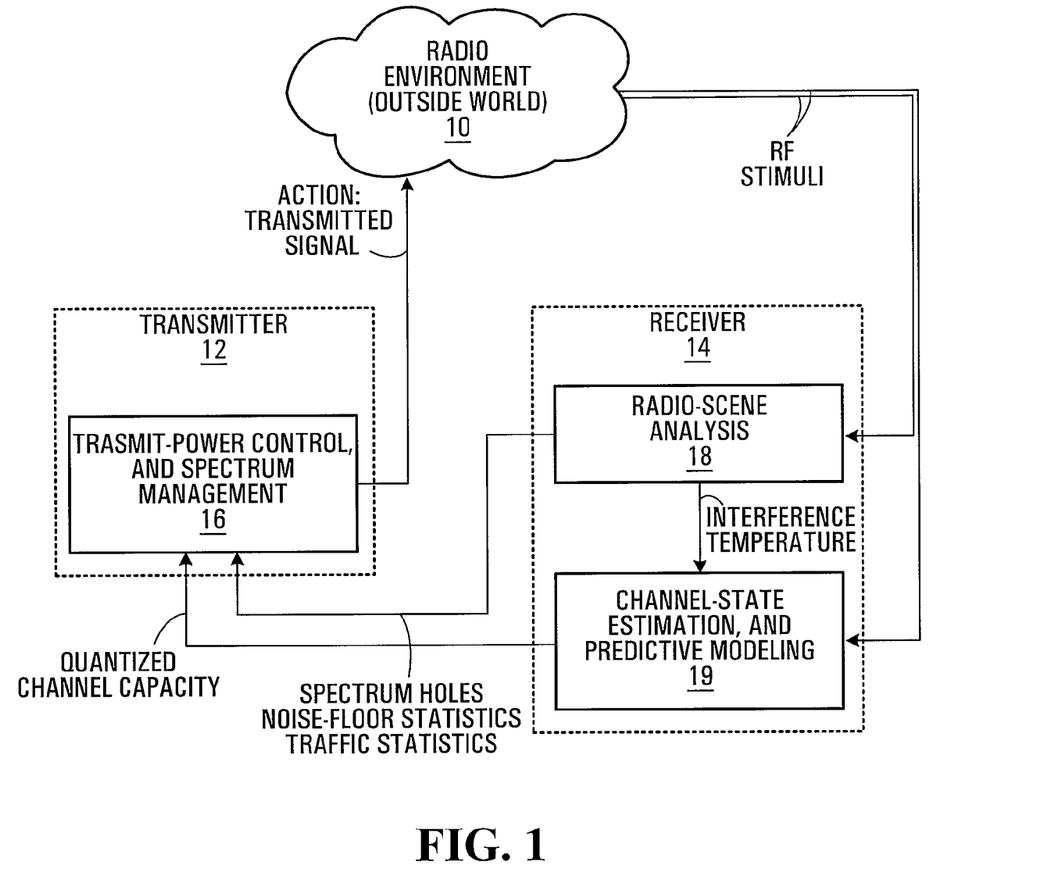
FIG. 1 is a block diagram representation of a cognitive cycle.

These three tasks form a cognitive cycle, which is pictured in one basic form in the block diagram of FIG. 1. Through interaction with the RF environment 10, tasks (i) and (ii), shown at 18 and 19 in FIG. 1, would typically be carried out in a receiver 14, whereas task (iii), shown in FIG. 1 at 16, is carried out in a transmitter 12.

The cognitive cycle shown in FIG. 1 pertains to a one-way communication path, with the transmitter 12 and the receiver 14 located in two different places. In a two-way communication scenario, both a receiver and a transmitter or alternatively a transceiver (i.e., a combination of transmitter and receiver) would be provided at communication equipment at each end of the communication path. All of the cognitive functions embodied in the cognitive cycle of FIG. 1 are then supported at each of a wireless communication device and a base station, for example.

From this brief discussion, it is apparent that a cognitive module in the transmitter 12 preferably works in a harmonious manner with the cognitive modules in the receiver 14. In order to maintain this harmony between the cognitive radio's transmitter 12 and receiver 14 at all times, a feedback channel connecting the receiver 14 to the transmitter 12 may be provided. Through the feedback channel, the receiver 14 is enabled to convey information on the performance of the forward link to the transmitter 12. The cognitive radio, in one implementation, is therefore an example of a feedback communication system.

One other comment is in order. A broadly-defined cognitive radio technology accommodates a scale of differing degrees of cognition. At one end of the scale, the user may simply pick a spectrum hole and build its cognitive cycle around that hole. At the other end of the scale, the user may employ multiple implementation technologies to build its cognitive cycle around a wideband spectrum hole or set of narrowband spectrum holes to provide the best expected performance in terms of spectrum management and transmit-power control, and do so in the most highly secure manner possible.

From a historical perspective, the development of cognitive radio is still at a conceptual stage, unlike conventional radio. Nevertheless, cognitive radio may have the potential for making a significant difference to the way in which the radio spectrum can be accessed with improved utilization of the spectrum as a primary objective. Indeed, given its potential, cognitive radio can be justifiably described as a disruptive, but unobtrusive technology.

Embodiments of the present invention relate to signal-processing and adaptive procedures which lie at the heart of cognitive radio. In particular, the present application discloses radio-scene analysis techniques. Transmitter power control in cognitive radio is described in detail in International (PCT) Patent Application Serial No. PCT/CA2005/001565, entitled "TRANSMIT POWER CONTROL TECHNIQUES FOR WIRELESS COMMUNICATION SYSTEMS", filed on Oct. 13, 2005, the entire contents of which are incorporated herein by reference, and in the above-referenced U.S. Provisional Patent Application Ser. No. 60/617,639.

In the following description, the notion of interference temperature is introduced as a metric for the quantification and management of interference in a radio environment. Non-parametric spectrum analysis, with emphasis on a multitaper method for spectral estimation, and its application to noise-floor estimation is then considered, followed by a discussion of the related issue of spectrum hole detection.

Currently, the radio environment is transmitter-centric, in the sense that transmitted power is typically controlled to approach a prescribed noise floor at a certain distance from the transmitter. However, it is possible for the RF noise floor to rise due to the unpredictable appearance of new sources of interference, thereby causing a progressive degradation of the signal coverage. To guard against such a possibility, the FCC Spectrum Policy Task Force in the report referenced above recommended a paradigm shift in interference assessment, that is, a shift away from largely fixed operations in the transmitter and toward real-time interactions between the transmitter and receiver in an adaptive manner. The recommendation is based on a new metric called the interference temperature, which is intended to quantify and manage the sources of interference in a radio environment.

The specification of an interference-temperature limit provides a "worst-case" characterization of the RF environment in a particular frequency band at a particular geographic location where the receiver could be expected to operate satisfactorily. The concept of interference temperature density, the interference temperature per capture area of a receiving antenna, may also be considered. Interference temperature density could be made independent of particular receiving antenna characteristics through the use of a reference antenna, for example.

The above-referenced recommendation of the FCC Spectrum Policy Task Force is made with two key benefits in mind:

(i) the interference temperature at a receiving antenna provides an accurate measure for the acceptable level of RF interference in the frequency band of interest—any transmission in that band is considered to be "harmful" if it would increase the noise floor above the interference-temperature limit; and (ii) given a particular frequency band in which the interference temperature is not exceeded, that band could be made available to unserviced users. The interference-temperature limit would then serve as a "cap" placed on potential RF energy that could be introduced into that band.

For obvious reasons, regulatory agencies could be responsible for setting the interference-temperature limit, bearing in mind the condition of the RF environment that exists in the frequency band under consideration. However, it is also contemplated that other entities such as wireless network operators and/or service providers might also or instead be involved in setting interference-temperature limits.

In regard to a unit of measurement for interference temperature, following the well-known definition of equivalent noise temperature of a receiver, interference temperature may in some embodiments be measured in degrees Kelvin. Moreover, the interference-temperature limit, $T_{max}$, multiplied by Boltzmann's constant, $k=1.3807 \times 10^{-23}$ Joules per degree Kelvin, could be used to determine a corresponding upper limit on permissible power spectral density in a frequency band of interest. Joules per second or, equivalently, Watts per Hertz may be used as a measure of power spectral density of a transmitter.

Radio-scene analysis involves several space-time processing considerations. The stimuli generated by radio emitters are nonstationary spatio-temporal signals in that their statistics depend on both time and space. Thus, the passive task of radio-scene analysis involves space-time processing, which may encompass any or all of the following operations:
  (i) two adaptive, spectrally-related functions, namely estimation of the interference temperature and detection of spectrum holes, both of which are performed at the receiving end of the system; and
  (ii) adaptive beamforming for interference control, which may be performed at both the transmitting and receiving ends of the system in a complementary fashion.

Information obtained on the two former functions may be sent to the transmitter via a feedback channel for use in carrying out the joint functions of active transmit power control and dynamic spectrum management.

Unfortunately, the statistical analysis of nonstationary signals, exemplified by RF stimuli, has had a rather mixed history. Although the general second-order theory of nonstationary signals is commonly known, it has not been applied nearly as extensively as the theory of stationary processes, which was first published at about the same time.

To account for the nonstationary behavior of a signal, time is included (implicitly or explicitly) in a statistical description of the signal. Given the desirability of working in the frequency domain for well-established reasons, the effect of time may be included by adopting a time-frequency distribution of the signal. Although various estimates of time-frequency distributions are known, most of the work in this area assumes the signal to be deterministic. In addition, many of the proposed estimators of time-frequency distributions are constrained to match time and frequency marginal density conditions. However, the frequency marginal distribution is, except for a scaling factor, just the periodogram of the signal, which is a badly biased and inconsistent estimator of the power spectrum.

Matching marginal distributions is therefore not considered to be overly important. Rather, a stochastic approach to time-frequency distributions is preferred. For the stochastic approach, we may proceed in one of two ways:
  (i) the incoming RF stimuli are sectioned into a continuous sequence of successive bursts, with each burst being short enough to justify pseudo-stationarity and yet long enough to produce an accurate spectral estimate; and
  (ii) time and frequency are considered jointly under the Loève transform.

Approach (i) is well suited for wireless communications. In any event, a nonparametric method for spectral estimation that is both accurate and principled may be preferred. In accordance with an aspect of the invention, multitaper spectral estimation is the method of choice.

In spectral estimation literature, it is well known that the estimation problem is made difficult by the bias-variance dilemma, which encompasses the interplay between two points:
  (i) bias of the power-spectrum estimate of a time series, due to the sidelobe leakage phenomenon, is reduced by tapering (i.e., windowing) the time series; and
  (ii) the cost incurred by this improvement is an increase in variance of the estimate, which is due to the loss of information resulting from a reduction in the effective sample size.

One technique for addressing the bias-variance dilemma involves dividing the time series into a set of possible overlapping segments, computing a periodogram for each tapered (windowed) segment, and then averaging the resulting set of power spectral estimates. However, this type of technique is presently rather ad-hoc in its formulation.

A preferred technique for mitigating the loss of information due to tapering involves the use of multiple orthonormal tapers (windows), an idea that was first applied to spectral estimation by Thomson in 1982 (D. J. Thomson, "Spectrum Estimation and Harmonic Analysis", Proc. IEEE, vol. 20, pp. 1055-1096, September 1982). The idea is embodied in the multitaper spectral estimation procedure.

Specifically, the procedure linearly expands the part of the time series in a fixed bandwidth f−W to f+W (centered on some frequency f) in a special family of sequences known as the Slepian sequences. The Slepian sequences are also known as discrete prolate spheroidal sequences. The remarkable property of Slepian sequences is that their Fourier transforms have their maximal energy concentration in the bandwidth f−W to f+W under a finite sample-size constraint. This property, in turn, allows us to trade spectral resolution for improved spectral characteristics, namely reduced variance of the spectral estimate without compromising the bias of the estimate.

Given a time series $\{x_t\}_{t=1}^N$, the multitaper spectral estimation procedure determines two things:
  (i) an orthonormal sequence of K Slepian tapers denoted by $\{w_t^{(k)}\}_{t=1}^N$; and
  (ii), associated eigenspectra defined by the Fourier transforms $$Y_k(f) = \sum_{t=1}^N w_t^{(k)} x(t) e^{-j2\pi ft}, k = 0, 1, \ldots K-1 \qquad (1)$$

The energy distributions of the eigenspectra are concentrated inside a resolution bandwidth, denoted by 2W. The time-bandwidth product $$p = 2NW \qquad (2)$$

defines the degrees of freedom available for controlling the variance of the spectral estimator. The choice of parameters K and p provides a tradeoff between spectral resolution and variance.

For an estimate of the variance of a multitaper spectral estimator, we may use a resampling technique which is generally referred to as "jackknifing". The technique bypasses the need for finding an exact analytic expression for the probability distribution of the spectral estimator, which may be impractical because time-series data (e.g., stimuli produced by the radio environment) are typically nonstationary, nonGaussian, and frequently contain outliers. It may also be argued that the multitaper spectral estimation procedure results in nearly uncorrelated coefficients, which provides further justification for the use of jackknifing.

A natural spectral estimate, based on the first few eigenspectra that exhibit the least sidelobe leakage, is given by $$\hat{S}(f) = \frac{\sum_{k=0}^{K-1} \lambda_k(f) |Y_k(f)|^2}{\sum_{k=0}^{K-1} \lambda_k(f)} \qquad (3)$$

where $\lambda_k$ is the eigenvalue associated with the kth eigenspectrum. Two points are noteworthy:
  (i) the denominator in (3) makes the estimate $\hat{S}(f)$ unbiased; and
  (ii) provided that we choose K=2NW−1, then the eigenvalue $\lambda_k$ is close to unity, in which case $$K \approx \sum_{k=0}^{K-1} \lambda_k.$$

Moreover, the spectral estimate $\hat{S}(f)$ can be improved by the use of "adaptive weighting", which is designed to minimize the presence of broadband leakage in the spectrum.

It is important to note that the multitaper spectral estimation procedure can be interpreted as an approximation of a maximum-likelihood power spectrum estimator. Moreover, for wideband signals, the multitaper spectral estimation procedure is nearly optimal in the sense that it almost achieves the Cramér-Rao bound for a nonparametric spectral estimator. Most important, unlike the maximum-likelihood spectral estimator, the multitaper spectral estimator is computationally feasible.

Spectral estimation accounts for the temporal characteristic of RF stimuli. To account for the spatial characteristic of RF stimuli, we resort to the use of adaptive beamforming. The motivation for so doing is interference control at the cognitive radio receiver, which is achieved in two stages.

In the first stage of interference control, the transmitter exploits geographic awareness to focus its radiation pattern along the direction of the receiver. Two beneficial effects result from beamforming in the transmitter:
(i) at the transmitter, power is preserved by avoiding radiation of the transmitted signal in all directions; and
(ii) assuming that every cognitive radio transmitter follows a strategy similar to that summarized under point (i), interference at the receiver due to the actions of other transmitters is minimized.

At the receiver, beamforming is performed for the adaptive cancellation of residual interference from known transmitters as well as interference produced by other unknown transmitters. For this purpose, we may use a robust version of a generalized sidelobe canceller, which is designed to protect a target RF signal and place nulls along the directions of interferers.

With cognitive radio being receiver-centric, the receiver is preferably provided with a reliable and accurate spectral estimate of the interference temperature. This goal may be achieved, for example, by doing two things:
(i) using the multitaper method to estimate the power spectrum of the interference temperature due to the cumulative distribution of both internal sources of noise and external sources of RF energy; and
(ii) using a large number of sensors to properly "sniff" the RF environment, wherever it is feasible. A relatively large number of sensors may be desirable to account for the spatial variation of the RF stimuli from one location to another.

Although the estimate under approach (i) is believed to be near-optimal, the issue of multiple-sensor permissibility is raised under point (ii) because of the diverse ways in which wireless communications could be deployed. For example, in an indoor building environment and communication between one building and another, it may be feasible to use multiple sensors (i.e., antennas) placed at strategic locations in order to improve the reliability of interference-temperature estimation. On the other hand, in the case of an ordinary mobile communication device with limited real estate, the interference-temperature estimation may have to be confined to a single sensor. In what follows, the multiple-sensor scenario is described, recognizing that it includes the single-sensor scenario as a special case.

Let M denote the total number of sensors deployed in the RF environment. Let $Y_k^{(m)}(f)$ denote the kth eigenspectrum computed by the mth sensor. We may then construct the M-by-K spatio-temporal complex-valued matrix $$A(f) = \begin{bmatrix} w_1 Y_1^{(1)}(f) & w_1 Y_2^{(1)}(f) & \ldots & w_1 Y_K^{(1)}(f) \\ w_2 Y_1^{(2)}(f) & w_2 Y_2^{(2)}(f) & \ldots & w_2 Y_K^{(2)}(f) \\ \vdots & & & \vdots \\ w_M Y_1^{(M)}(f) & w_M Y_2^{(M)}(f) & \ldots & w_M Y_K^{(M)}(f) \end{bmatrix} \quad (4)$$

where each column is produced using stimuli sensed at a different gridpoint, each row is computed using a different Slepian taper, and the $\{w_m\}_{m=1}^M$ represent variable weights accounting for relative areas of gridpoints.

These variable weights represent a form of adjustable parameter, which can be changed depending on operating environment analysis. An adjustable parameter such as the variable weights can be used to adapt a signal processing algorithm to a changing operating environment.

Each entry in the matrix $A(f)$ is produced by two contributions, one due to additive internal noise in the sensor and the other due to the incoming RF stimuli. Insofar as radio-scene analysis is concerned, however, the primary contribution of interest is that due to RF stimuli. An effective tool for effectively de-noising the RF stimuli contribution is the singular value decomposition (SVD), the application of which to the matrix $A(f)$ yields the decomposition $$A(f) = \sum_{k=0}^{K-1} \sigma_k(f) u_k(f) v_k^\dagger(f) \quad (5)$$

where $\sigma_k(f)$ is the kth singular value of matrix $A(f)$, $u_k(f)$ is the associated left singular vector, and $v_k(f)$ is the associated right singular vector. The superscript † denotes Hermitian transposition.

In analogy with principal components analysis, the decomposition of (5) may be viewed as one of the principal modulations produced by the external RF stimuli. According to (5), the singular value $\sigma_k(f)$ scales the kth principal modulation of matrix $A(f)$.

Forming the K-by-K matrix product $A^\dagger(f)A(f)$, we find that the entries on the main diagonal of this product, except for a scaling factor, represent the eigenspectrum due to each of the Slepian tapers, spatially averaged over the M sensors. Let the singular values of matrix $A(f)$ be ordered $|\sigma_0(f)| \geq |\sigma_1(f)| \geq \ldots \geq |\sigma_{K-1}(f)| < 0$. The kth eigenvalue of $A^\dagger(f)A(f)$ is $|\sigma_k(f)|^2$. We may then make the following statements:
(i) the largest eigenvalue, namely $|\sigma_0(f)|^2$, provides an estimate of the interference temperature, except for a constant—this estimate may be improved by using a linear combination of the largest two or three eigenvalues: $|\sigma_k(f)|^2$, k=0, 1, 2;
(ii) the left singular vectors $u_k(f)$ give the spatial distribution of the interferers; and
(iii) the right singular vectors $v_k(f)$ give the multitaper coefficients for the interferers' waveform.

To summarize, multitaper spectral estimation combined with singular value decomposition provides an effective procedure for estimating the power spectrum of the noise floor in an RF environment. This procedure is computationally intensive but nevertheless manageable. The computation of eigenspectra followed by singular value decomposition may be repeated at each frequency of interest.

In passively sensing the radio scene and thereby estimating the power spectra of incoming RF stimuli, we have a basis for classifying the spectra into three broadly defined types:
  (i) black spaces, which are occupied by high-power "local" interferers some of the time;
  (ii) grey spaces, which are partially occupied by low-power interferers; and
  (iii) white spaces, which are free of RF interferers except for ambient noise, made up of natural and artificial forms of noise, namely
    broadband thermal noise produced by external physical phenomena such as solar radiation,
    transient reflections from lightning, plasma (fluorescent) lights, and aircraft, for instance,
    impulsive noise produced by such sources as ignitions, commutators, and microwave appliances, and
    thermal noise due, for example, to internal spontaneous fluctuations of electrons at the front end of individual receivers.

White spaces, and to a lesser extent grey spaces, are obvious candidates for use by unserviced operators. Of course, black spaces are to be avoided whenever and wherever the RF emitters residing in them are switched ON. However, when at a particular geographic location those emitters are switched OFF and the black spaces assume the new role of "spectrum holes", cognitive radio provides the opportunity for creating significant "white spaces" by invoking its dynamic-coordination capability for spectrum sharing, as discussed in further detail below.

From the foregoing, it is apparent that a reliable strategy for the detection of spectrum holes may be of importance to the design and practical implementation of cognitive radio systems. Moreover, the multitaper method combined with singular-value decomposition, hereafter referred to primarily as the MTM-SVD method, provides one technique for solving this detection problem by virtue of its accuracy and near-optimality.

In M. E. Mann and J. Park, "Oscillatory Spatiotemporal Signal Detection in Climate Studies: A Multiple-Taper Spectral Domain Approach", which appeared in R. Dnowska and B. Saltzman, editors, Advances in Geophysics, vol. 41, pp. 1-131, Academic Press, 1999, Mann and Park discuss the application of the MTM-SVD method to the detection of oscillatory spatial-temporal signals in climate studies. They show that this new methodology avoids the weaknesses of traditional signal-detection techniques. In particular, the methodology permits a faithful reconstruction of spatio-temporal patterns of narrowband signals in the presence of additive spatially correlated noise.

By repeated application of the MTM-SVD method to the RF stimuli at a particular geographic location and from one burst of operation to the next, a time-frequency distribution of that location may be computed. The dimension of time is quantized into discrete intervals separated by the burst duration. The dimension of frequency is also quantized into discrete intervals separated by resolution bandwidth of the multitaper spectral estimation procedure.

Let L denote the number of largest eigenvalues considered to play important roles in estimating the interference temperature, with $|\sigma_l(f,t)|^2$ denoting the lth largest eigenvalue produced by the burst of RF stimuli received at time t. Let R denote the number of frequency resolutions of width $\Delta f$, which occupy the black space or grey space under scrutiny. Then setting the discrete frequency $f=f_{low}+v\cdot\Delta f$ for $v=0, 1, \ldots, M-1$, where $f_{low}$ denotes the lowest end of a black/grey space, we may define the decision statistic for detecting the transition from such a space into a white space (i.e., spectrum hole) as $$D(t) = \sum_{l=0}^{L-1} \sum_{v=0}^{R-1} |\sigma_l(f_{low} + v\cdot\Delta f; t)|^2 \Delta f. \tag{6}$$

Spectrum-hole detection may be declared, for example, if two conditions are satisfied:
  (i) a reduction in D(t) from one burst to the next exceeds a prescribed threshold for one or more successive bursts; and
  (ii) once the transition is completed, D(t) assumes minor fluctuations typical of ambient noise.

For a more refined approach, an adaptive filter may be used for change detection. Except for a scaling factor, the decision statistic D(t) provides an estimate of the interference temperature as it evolves with time t discretized in accordance with burst duration. An adaptive filter might thus be designed to produce a model for the time evolution of D(t) when the RF emitter responsible for the black space is switched ON. Assuming that the filter is provided with a sufficient number of adjustable parameters and the adaptive process makes it possible for the filter to produce a good fit to the evolution of D(t) with time t, the sequence of residuals produced by the model would ideally be the sample function of a white noise process. Of course, this state of affairs would hold only when the emitter in question is switched ON. Once the emitter is switched OFF, thereby setting the stage for the creation of a spectrum hole, the whiteness property of the model output disappears, which, in turn, provides the basis for detecting the transition from a black space into a spectrum hole.

Whichever approach is used, the change-detection procedure may be location-specific. For example, if the detection is performed in the basement of a building, the change in D(t) from a black space to a white space is expected to be significantly smaller than in an open environment. In any event, the detection procedure is preferably sensitive enough to work satisfactorily, regardless of location.

The effort involved in the detection of spectrum holes and their subsequent exploitation in the management of radio spectrum should not be underestimated. In practical terms, the task of spectrum management should be impervious, or at least not overly sensitive, to the modulation formats of primary users and also several other factors.

For example, radio propagation across a wireless channel is known to be affected by environmental factors such as path loss, which refers to the diminution of received signal power with distance between the transmitter and the receiver, and shadowing, which causes received signal power to fluctuate about the path loss by a multiplication factor, thereby resulting in "coverage" holes.

Exclusive zones, or areas (i.e., a circle with some radius centered on a normal location of a primary user) inside which the spectrum is free of use and can therefore be made available to an unserviced operator, may require special attention in two possible scenarios. In one scenario, the primary user happens to operate outside the exclusive zone, in which case the identification of a spectrum hole should not be sensitive to radio interference produced by the primary user. Wireless communication networks which are built around cooperative relay (ad-hoc) networks are designed to operate at very low transmit powers and represent another scenario with which a dynamic spectrum management algorithm is preferably able to cope.

The identification of a spectrum hole at a particular geographic location and a particular time will typically only hold for that particular time and not necessarily for a future time. Accordingly, a spectrum hole-based dynamic spectrum management algorithm in a transmitter preferably provides for continuous monitoring of a spectrum hole in question and alternative spectral route determination for dealing with the eventuality of the primary user needing the spectrum for its own use.

Dynamic spectrum management, also commonly referred to as dynamic frequency allocation, is a process which could be performed in a transmitter. Transmit power control, as noted above, is also performed in a transmitter. These two tasks are so intimately related to each other that both may be included in a single functional module which performs the role of multiple-access control in the basic cognitive cycle of FIG. 1.

Simply put, one primary purpose of spectrum management is to develop an adaptive strategy for the efficient and effective utilization of the RF spectrum. Specifically, a spectrum management algorithm according to an aspect of the invention may build on the spectrum holes detected during radio-scene analysis, and the output of a transmit power controller if a transmitter is so equipped, to select communication parameters such as a modulation strategy that adapt to the time-varying conditions of the radio environment, all the time assuring reliable communication across the channel.

A modulation strategy that lends itself to cognitive radio is OFDM, by virtue of its flexibility and computational efficiency. For its operation, OFDM uses a set of carrier frequencies centered on a corresponding set of narrow channel bandwidths. The availability of rate feedback (through the use of a feedback channel) permits the use of bit-loading, whereby the number of bits/symbol for each channel is optimized for the signal-to-noise ratio characterizing that channel.

Figure 2:
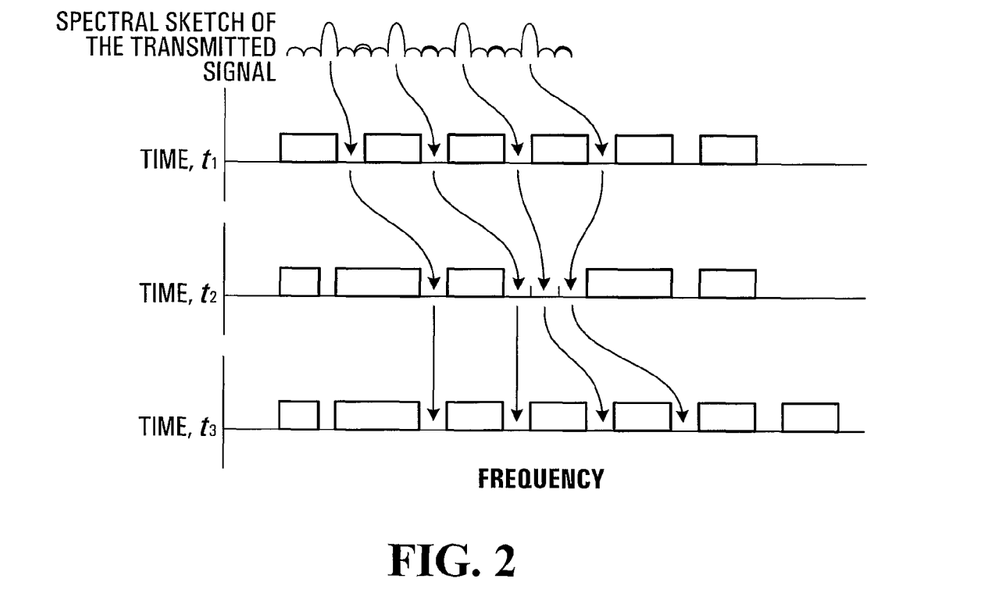
FIG. 2 is a time-frequency plot illustrating dynamic spectrum sharing for OFDM.

As time evolves and spectrum holes come and go, the bandwidth-carrier frequency implementation of OFDM is dynamically modified, as illustrated in the time-frequency plot pictured in FIG. 2 for the case of 4 carrier frequencies. FIG. 2 illustrates a distinctive feature of cognitive radio: a dynamic spectrum sharing process, which evolves in time. In effect, the spectrum sharing process satisfies the constraint imposed on cognitive radio by the availability of spectrum holes at a particular geographic location and their possible variability with time. Throughout the spectrum-sharing process, a transmit power controller may keep an account of the bit-loading across the spectrum holes currently in use. In effect, a dynamic spectrum manager and a transmit power controller may work in concert together, thereby providing multiple-access control.

Starting with a set of spectrum holes, it is possible for a dynamic spectrum management algorithm to confront a situation where a prescribed frame-error rate cannot be satisfied. In situations of this kind, the algorithm can do one of two things:

(i) work with a more spectrally efficient modulation strategy; or else
(ii) incorporate the use of one or more other spectrum holes.

In approach (i), the algorithm resorts to increased computational complexity, and in approach (ii), it resorts to increased channel bandwidth so as to maintain communication reliability.

A dynamic spectrum management algorithm may take traffic considerations into account. In a code-division multiple access (CDMA) system like IS-95, for example, there is a phenomenon called cell breathing. Cells in the system effectively shrink and grow over time. Specifically, if a cell has more users, then the interference level tends to increase, which is counteracted by allocating a new incoming user to another cell. That is, the cell coverage is reduced. If, on the other hand, a cell has less users, then the interference level is correspondingly lowered, in which case the cell coverage is allowed to grow by accommodating new users. So in a CDMA system, traffic and interference levels are associated together. In a cognitive radio system based on CDMA, a dynamic spectrum management algorithm naturally focuses on the allocation of users, first to white spaces with low interference levels and then to grey spaces with higher interference levels.

When using other multiple-access techniques, such as OFDM, co-channel interference should be avoided. To achieve this goal, a dynamic-spectrum management algorithm may include a traffic model of the primary user occupying a black space. The traffic model, which could be built on historical data, provides a basis for predicting future traffic patterns in that space which, in turn, makes it possible to predict the duration for which a spectrum hole vacated by the incumbent primary user is likely to be available for use by a cognitive radio operator.

In a wireless environment, two classes of traffic data pattern are distinguished, including deterministic patterns and stochastic patterns. In a deterministic traffic pattern, the primary user (e.g., TV transmitter, radar transmitter) is assigned a fixed time slot for transmission. When it is switched OFF, the frequency band is vacated and can therefore be used by a cognitive radio operator. Stochastic patterns, on the other hand, can only be described in statistical terms. Typically, the arrival times of data packets are modeled as a Poisson process, while the service times are modeled as uniformly distributed or Poisson distributed, depending on whether the data are packet-switched or circuit-switched, respectively. In any event, the model parameters of stochastic traffic data vary slowly, and therefore lend themselves to on-line estimation using historical data. Moreover, by building a tracking strategy into design of the predictive model, the accuracy of the model can be further improved.

Figure 3:
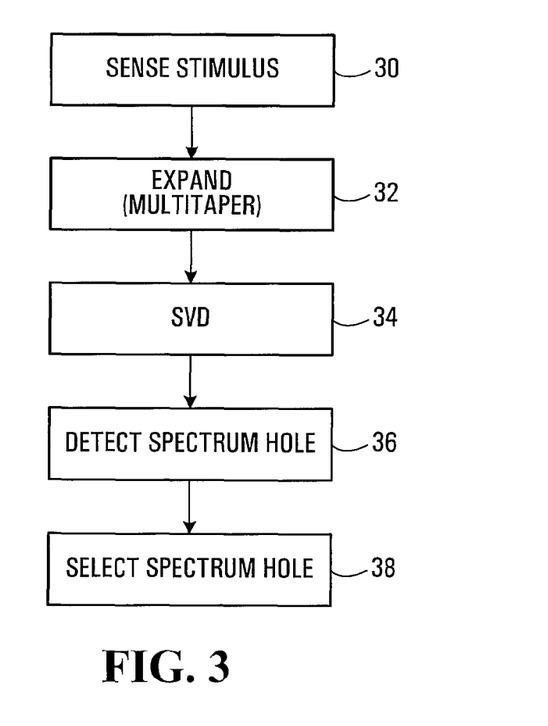
FIG. 3 is a flow diagram of a method according to an embodiment of the invention.

Operating environment analysis techniques have been described in substantial detail above. FIG. 3 is a flow diagram of a method according to an embodiment of the invention, and provides a broader overview of operating environment analysis.

The method begins at 30 with the sensing of one or more stimuli. The sensed stimuli are then linearly expanded at 32 using a multitaper spectral estimation procedure and Slepian sequences. At 34, a singular value decomposition is performed on the linearly expanded stimuli. A singular value of the linearly expanded stimuli provides an estimate of interference at the location of wireless communication equipment at which the method is implemented.

One possible application of the knowledge gained through operating environment or radio scene analysis is in spectrum management, which is represented in FIG. 3 by spectrum hole detection at 36, based on estimated interference, and selection at 38. Dynamic spectrum management may be provided by continuing to monitor the operating environment to detect and possibly make use of further spectrum holes.

Figure 4:
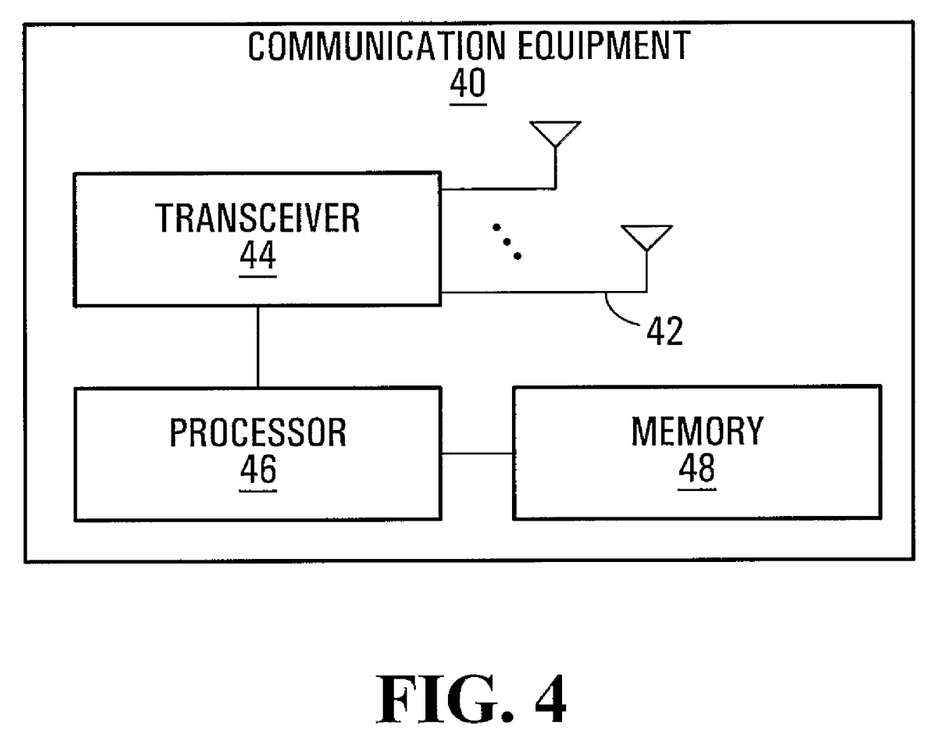
FIG. 4 is a block diagram of communication equipment in which embodiments of the invention may be implemented.

FIG. 4 is a block diagram of communication equipment in which embodiments of the invention may be implemented. The communication equipment 40 includes a transceiver 44 and one or more antennas 42 for receiving communication signals (including stimuli from interferers) from and transmitting communication signals to other communication equipment. Multiple antennas 42 are provided, for example, in Multiple-Input Multiple-Output (MIMO) communication equipment. The communication equipment 40 also includes a processor 46 connected to the transceiver 44 and a memory 48.

Many different types of transceiver 44 and antennas 42 will be apparent to those skilled in the art. The particular types of the transceiver 44 and to some extent the antennas 42 are dependent upon, for example, the type of the communication equipment 40 and/or the communication system in which it is intended to operate. The invention is in no way limited to any particular type of transceiver 44 or antennas 42.

The processor 46 may include or be implemented as a microprocessor or a digital signal processor, for example, which is configurable to perform any or all of the functions disclosed herein by executing software stored in the memory 48. Other functions may also be performed by the processor 46, such that the processor 46 is not necessarily a dedicated processor. The specific implementation of the processor 46 and the memory 48, or other functional elements used in further embodiments of the invention, may also be dependent to some extent on the type of the communication equipment 40 and/or the communication system in which it is intended to operate.

In a mobile communication device, for example, the memory 48 would typically include a solid state memory device, although other types of memory device may also or instead be provided in the communication equipment 40.

In operation, stimuli are received at the antennas 42 and provided to the processor 46 by the transceiver 44. The processor 46 processes the stimuli to analyze an operating environment of the communication equipment 40 substantially as described above. Communication signal receiving and transmitting operations may then be controlled on the basis of the operating environment analysis, in particular the detection of spectrum holes, for instance.

It should be appreciated that the present invention is in no way limited to the particular operations or system components explicitly shown in FIGS. 3 and 4. Embodiments of the invention may include further or fewer operations or components which are performed or connected differently than shown in the drawings. For example, the techniques disclosed herein may be applied to communication equipment in which only a receiver, a transmitter, or a single antenna or sensor are provided. The various functions disclosed herein may also be implemented using separate hardware, software, and/or firmware components and need not be performed by a single module such as the processor shown in FIG. 4. Other implementations of embodiments of the invention, as instructions stored on a machine-readable medium, for example, are also contemplated.

What has been described is merely illustrative of the application of the principles of the invention. Other arrangements and methods can be implemented by those skilled in the art without departing from the scope of the present invention.

Cognitive radio holds the promise of a new frontier in wireless communications. Specifically, with dynamic coordination of a spectrum sharing process, significant "white space" can be created which, in turn, makes it possible to improve spectrum utilization under constantly changing user conditions. The dynamic spectrum sharing capability builds on two matters:

(i) a paradigm shift in wireless communications from transmitter-centricity to receiver-centricity, whereby interference power rather than transmitter emission is regulated; and (ii) awareness of and adaptation to the environment by the radio.

Cognitive radio is a computer-intensive system, so much so that we may think of it as a radio with a computer inside or a computer that transmits. Such a system provides a novel basis for balancing the communication and computing needs of a user against those of a network with which the user would like to operate. With so much reliance on computing, language understanding may play a key role in the organization of domain knowledge for a cognitive cycle, which may include any or all the following:

(i) a wake cycle, as shown in FIG. 1, during which the cognitive radio supports the tasks of passive radio-scene analysis, active transmit-power control and dynamic spectrum management, and possibly other tasks such as channel-state estimation and predictive modeling;

(ii) a sleep cycle, during which incoming stimuli are integrated into the domain knowledge of a "personal digital assistant"; and (iii) a prayer cycle, which caters to items that cannot be dealt with during the sleep cycle and may therefore be resolved through interaction of the cognitive radio with the user in real time.

It is widely recognized that the use of a MIMO antenna architecture can provide for a spectacular increase in the spectral efficiency of wireless communications. With improved spectrum utilization as one of the primary objectives of cognitive radio, it seems logical to explore building the MIMO antenna architecture into the design of cognitive radio. The end result is a cognitive MIMO radio that offers the ultimate in flexibility, which is exemplified by four degrees of freedom: carrier frequency, channel bandwidth, transmit power, and multiplexing gain.

Turbo processing has established itself as one of the key technologies for modern digital communications. In specific terms, turbo processing has made it possible to provide significant improvements in the signal processing operations of channel decoding and channel equalization, both of which are basic to the design of digital communication systems. Compared to traditional design methodologies, these improvements manifest themselves in spectacular reductions in frame error rates for prescribed signal-to-noise ratios. It also seems logical to build turbo processing into the design of cognitive radio in order to support Quality of Service (QoS) requirements, for example.

With computing being so central to the implementation of cognitive radio, it is natural that we keep nanotechnology in mind as we look to the future. Since the first observation of multi-walled carbon nanotubes in transmission electron microscopy studies, carbon nanotubes have been explored extensively in theoretical and experimental studies of nanotechnology. Nanotubes offer the potential for a paradigm shift from the narrow confine of today's information processing based on silicon technology to a much broader field of information processing, given the rich electro-mechano-opto-chemical functionalities that are endowed in nanotubes. This paradigm shift may well impact the evolution of cognitive radio in its own way.

The potential for cognitive radio to make a significant difference to wireless communications is immense, hence the reference to it as a disruptive but unobtrusive technology. In the final analysis, however, one key issue that may shape the evolution of cognitive radio in the course of time, be that for civilian or military applications, is trust, which is two-fold, including trust by the users of cognitive radio, and trust by all other users who might be interfered with.

I claim:

1. A method of analyzing an operating environment of wireless communication equipment in a wireless communication system, comprising:
sensing a stimulus in the operating environment at a location of the wireless communication equipment;
linearly expanding the stimulus in Slepian sequences using a multitaper spectral estimation procedure; and
performing a singular value decomposition on the linearly expanded stimulus, a singular value of the linearly expanded stimulus providing an estimate of interference at the location of the wireless communication equipment.

2. The method of claim 1, wherein sensing comprises sensing a stimulus at each of M sensors, and wherein linearly expanding comprises determining elements of a spatio-temporal complex-valued matrix $$A(f) = \begin{bmatrix} w_1 Y_1^{(1)}(f) & w_1 Y_2^{(1)}(f) & \ldots & w_1 Y_K^{(1)}(f) \\ w_2 Y_1^{(2)}(f) & w_2 Y_2^{(2)}(f) & \ldots & w_2 Y_K^{(2)}(f) \\ \vdots & & & \vdots \\ w_M Y_1^{(M)}(f) & w_M Y_2^{(M)}(f) & \ldots & w_M Y_K^{(M)}(f) \end{bmatrix}$$

where
elements of each column of the matrix are produced using stimuli sensed by respective sensors;
elements of each row of the matrix are computed using a different one of K Slepian sequences;
$\{w_m\}_{m=1}^{M}$ represent variable weights accounting for respective relative areas covered by the M sensors; and
$Y_k^{(m)}(f)$ denote kth eigenspectra computed by an mth sensor.

3. The method of claim 2, wherein performing comprises performing a singular value decomposition on the matrix A(f) to thereby yield the decomposition $$A(f) = \sum_{k=0}^{K-1} \sigma_k(f) u_k(f) v_k^{\dagger}(f)$$

where
$\sigma_k(f)$ is a kth singular value of matrix A(f);
$u_k(f)$ is an associated right singular vector; and
$v_k(f)$ is an associated right singular vector;
the superscript † denotes Hermitian transposition.

4. The method of claim 3, wherein $|\sigma_0(f)|^2$ or a linear combination of multiple largest $|\sigma_k(f)|^2$ provides the estimate of interference.

5. The method of claim 4, further comprising:
computing a time-frequency distribution of interference estimates for the location of the wireless communication equipment by repeating the steps of sensing, linearly expanding, and performing for a plurality of bursts of operation.

6. The method of claim 5, further comprising:
determining $$D(t) = \sum_{l=0}^{L-1} \sum_{v=0}^{R-1} |\sigma_l(f_{low} + v \cdot \Delta f; t)|^2 \Delta f,$$

where
L denotes the number of largest $|\sigma_k(f)|^2$ used in the estimate of interference;
$|\sigma_l(f,t)|^2$ denotes the lth largest eigenvalue produced by a burst of stimuli received at time t;
R denotes a number of frequency resolutions of width $\Delta f$ which occupy a portion of a frequency spectrum currently being analyzed; and
$f_{low}$ denotes a lowest end of the portion of frequency spectrum currently being analyzed;
determining whether a reduction in D(t) from one burst to a next burst exceeds a threshold; and
detecting a spectrum hole in which resources are available for transmission of communication signals by a transmitter where a reduction in D(t) from one burst to a next burst exceeds the threshold.

7. The method of claim 6, wherein determining further comprises determining whether fluctuations in D(t) subsequent to the reduction are less than a further threshold for a subsequent burst, and wherein detecting comprises detecting a spectrum hole where a reduction in D(t) from one burst to a next burst exceeds the threshold and fluctuations in D(t) subsequent to the reduction are less than the further threshold.

8. The method of claim 1, further comprising:
detecting, based on the estimate of interference, a spectrum hole in which resources are available for transmission of communication signals by a transmitter; and
selecting the detected spectrum hole for transfer of communication signals.

9. The method of claim 8, further comprising:
repeating the sensing, linearly expanding, and performing;
detecting a further spectrum hole; and
selecting the further spectrum hole for transfer of communication signals.

10. The method of claim 9, further comprising:
transferring communication signals using both the selected spectrum hole and the further spectrum hole.

11. The method of claim 9, further comprising:
predicting subsequent availability of the selected spectrum hole; and
selecting the further spectrum hole for transfer of communication signals where the selected spectrum hole is predicted to become unavailable.

12. The method of claim 11, wherein the predicting is based on historical communication traffic patterns for the selected spectrum hole.

13. The method of claim 1, further comprising:
transmitting the estimate of interference to a transmitter of communication signals.

14. A non-transitory machine-readable medium storing instructions which when executed perform the method of claim 1.

15. A system for analyzing an operating environment of wireless communication equipment in a wireless communication system, comprising:
an input for receiving a stimulus in the operating environment at a location of the wireless communication equipment; and a processor operatively coupled to the input and configured to linearly expand the stimulus in Slepian sequences using a multitaper spectral estimation procedure, and to perform a singular value decomposition on the linearly expanded stimulus, a singular value of the linearly expanded stimulus providing an estimate of interference at the location of the wireless communication equipment.

16. The system of claim 15, wherein the processor is further configured to implement a cognitive radio.

17. The system of claim 15, further comprising:
a plurality of antennas; and
a transceiver operatively coupled to the plurality of antennas and to the input.

18. The system of claim 17, wherein the processor is further configured to output to the transceiver the estimate of interference, and wherein the transceiver is configured to transmit the estimate of interference to other communication equipment.

19. The system of claim 15, further comprising:
M sensors, each sensor being for sensing a stimulus,
wherein the processor is configured to linearly expand the stimuli sensed by the sensors by determining elements of a spatio-temporal complex-valued matrix $$A(f) = \begin{bmatrix} w_1 Y_1^{(1)}(f) & w_1 Y_2^{(1)}(f) & \ldots & w_1 Y_K^{(1)}(f) \\ w_2 Y_1^{(2)}(f) & w_2 Y_2^{(2)}(f) & \ldots & w_2 Y_K^{(2)}(f) \\ \vdots & & & \vdots \\ w_M Y_1^{(M)}(f) & w_M Y_2^{(M)}(f) & \ldots & w_M Y_K^{(M)}(f) \end{bmatrix}$$

where
elements of each column of the matrix are produced using stimuli sensed by respective sensors;
elements of each row of the matrix are computed using a different one of K Slepian sequences;
$\{w_m\}_{m=1}^{M}$ represent variable weights accounting for respective relative areas covered by the M sensors; and
$Y_k^{(m)}(f)$ denote kth eigenspectra computed by an mth sensor.

20. The system of claim 19, wherein the processor is configured to perform a singular value decomposition by performing a singular value decomposition on the matrix A(f) to thereby yield the decomposition $$A(f) = \sum_{k=0}^{K-1} \sigma_k(f) u_k(f) v_k^{\dagger}(f)$$

where
$\sigma_k(f)$ is a kth singular value of matrix A(f);
$u_k(f)$ is an associated left singular vector;
$v_k(f)$ is an associated right singular vector; and
the superscript † denotes Hermitian transposition.

21. The system of claim 20, wherein $|\sigma_0(f)|^2$ or a linear combination of multiple largest $|\sigma_k(f)|^2$ provides the estimate of interference.

22. The system of claim 21, wherein the input receives a stimulus at the location of the wireless communication equipment for a plurality of bursts of operation.

23. The system of claim 22, wherein the processor is further configured to determine $$D(t) = \sum_{l=0}^{L-1} \sum_{v=0}^{R-1} |\sigma_l(f_{low} + v \cdot \Delta f; t)|^2 \Delta f,$$

where
L denotes the number of largest $|\sigma_k(f)|^2$ used in the estimate of interference;
$|\sigma_l(f,t)|^2$ denotes the lth largest eigenvalue produced by a burst of stimuli received at time t;
R denotes a number of frequency resolutions of width $\Delta f$ which occupy a portion of a frequency spectrum currently being analyzed; and
$f_{low}$ denotes a lowest end of the portion of frequency spectrum currently being analyzed;
and to detect a spectrum hole in which resources are available for transmission of communication signals by a transmitter where a reduction in D(t) from one burst to a next burst exceeds a threshold.

24. The system of claim 23, wherein the processor is further configured to determine whether fluctuations in D(t) subsequent to the reduction are less than a further threshold for a subsequent burst, and to detect a spectrum hole where a reduction in D(t) from one burst to a next burst exceeds the threshold and fluctuations in D(t) subsequent to the reduction are less than the further threshold.

25. The system of claim 15, wherein the processor is further configured to detect, based on the estimate of interference, a spectrum hole in which resources are available for transmission of communication signals by a transmitter, and to select the detected spectrum hole for transfer of communication signals.

26. The system of claim 25, wherein the processor is further configured to monitor the operating environment to detect a further spectrum hole, and to select the further spectrum hole for transfer of communication signals.

27. The system of claim 26, wherein the processor is further configured to cause communication signals to be transferred using both the selected spectrum hole and the further spectrum hole.

28. The system of claim 26, wherein the processor is further configured to predict subsequent availability of the selected spectrum hole, and to select the further spectrum hole for transfer of communication signals where the selected spectrum hole is predicted to become unavailable.

29. The system of claim 28, wherein the processor is configured to predict availability of the selected spectrum hole based on historical communication traffic patterns for the selected spectrum hole.

* * * * *